United States Patent [19]

Lehureau

[11] Patent Number: 5,172,368
[45] Date of Patent: Dec. 15, 1992

[54] READER FOR OPTICAL RECORDING MEDIUM

[75] Inventor: Jean-Claude Lehureau, Ste Genevieve des Bois, France

[73] Assignee: Thomson-CSF, Puteaux, France

[21] Appl. No.: 603,735

[22] PCT Filed: Apr. 10, 1990

[86] PCT No.: PCT/FR90/00234
§ 371 Date: Nov. 15, 1990
§ 102(e) Date: Nov. 15, 1990

[87] PCT Pub. No.: WO90/13117
PCT Pub. Date: Nov. 1, 1990

[30] Foreign Application Priority Data

Apr. 25, 1989 [FR] France .................. 89 05451

[51] Int. Cl.⁵ .................................... G11B 7/00
[52] U.S. Cl. ............................ 369/112; 369/44.24; 369/109; 369/121
[58] Field of Search ............. 369/112, 44.23, 44.24, 369/111, 120, 44.12, 121, 122, 109; 250/515.1, 400; 359/19

[56] References Cited

U.S. PATENT DOCUMENTS

| | | | |
|---|---|---|---|
| 4,345,321 | 8/1982 | Arquie et al. | 369/112 |
| 4,829,506 | 5/1989 | Bresser et al. | 369/112 |
| 4,888,760 | 12/1989 | Shikama et al. | 369/112 |
| 4,918,675 | 4/1990 | Lee | 369/112 |
| 5,050,155 | 9/1991 | Kurata et al. | 369/112 |
| 5,066,138 | 11/1991 | Toide et al. | 369/112 |

FOREIGN PATENT DOCUMENTS

| | | |
|---|---|---|
| 0222238 | 5/1987 | European Pat. Off. . |
| 0241372 | 10/1987 | European Pat. Off. . |
| 0255173 | 2/1988 | European Pat. Off. . |
| 2538580 | 6/1984 | France . |
| 57-24033 | 2/1982 | Japan .................. 369/112 |
| 60-129942 | 7/1985 | Japan .................. 369/112 |
| 62-137737 | 6/1987 | Japan . |

Primary Examiner—Roy N. Envall, Jr.
Assistant Examiner—Nabil Hindi
Attorney, Agent, or Firm—Roland Plottel

[57] ABSTRACT

A device for reading an optical recording medium which includes a source (1) for emitting a first light beam (F1) along a main optical axis (01); a beam splitter (2) to direct, along the main optical axis, the first light beam towards the surface of the recording medium (5), and to split a second beam (F2) obtained by reflection of the first beam on the surface of the recording medium so as to form a third beam (F'3) directed along a secondary optical axis; a focusing lens (4) between the splitter (2) and the surface of the recording medium to focus the first beam on the surface; a mask to introduce a dissymmetry into the third beam; and at least one detection device (7) receiving at least one part of the third beam (F'3) and giving at least one electrical signal expressing the detection made. In this device, the mask is formed by part of an external surface of the light-emitting source (1), and the splitter (2) is positioned and made so that the mask is in the focusing plane of the third beam (F'3).

12 Claims, 3 Drawing Sheets

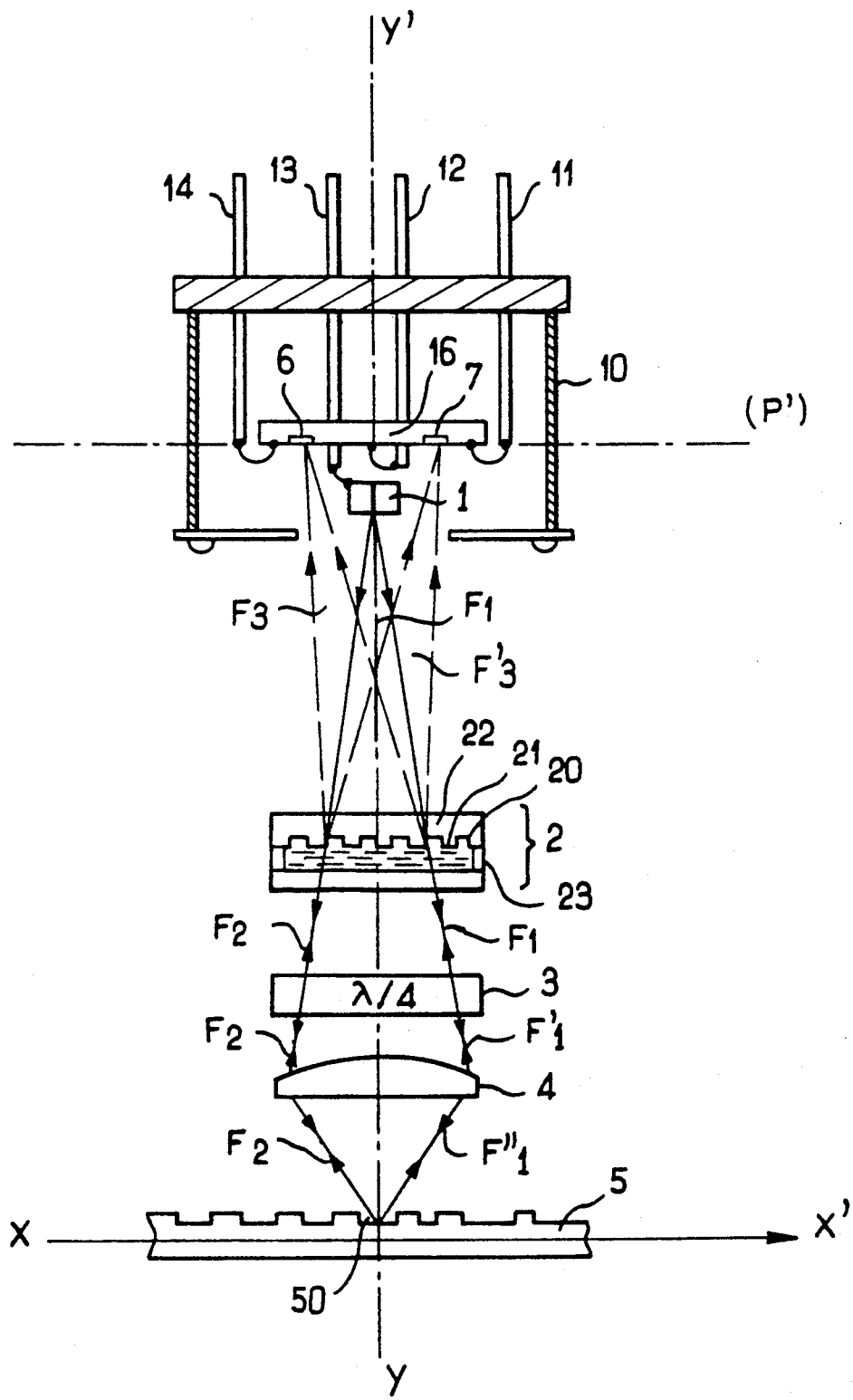

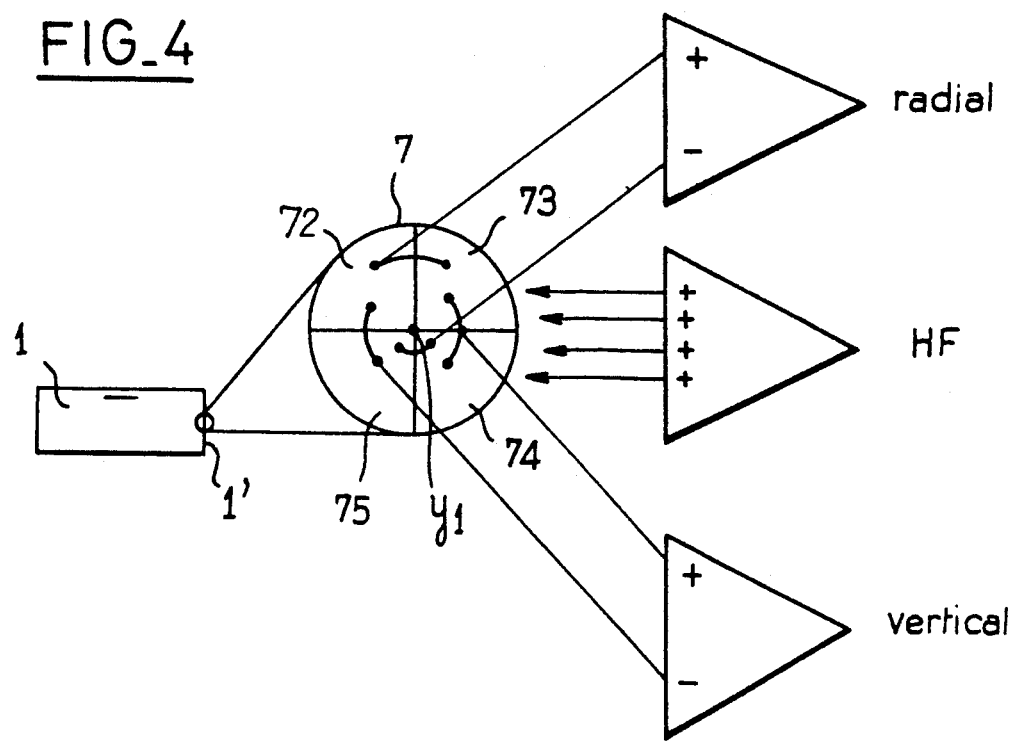
FIG_4
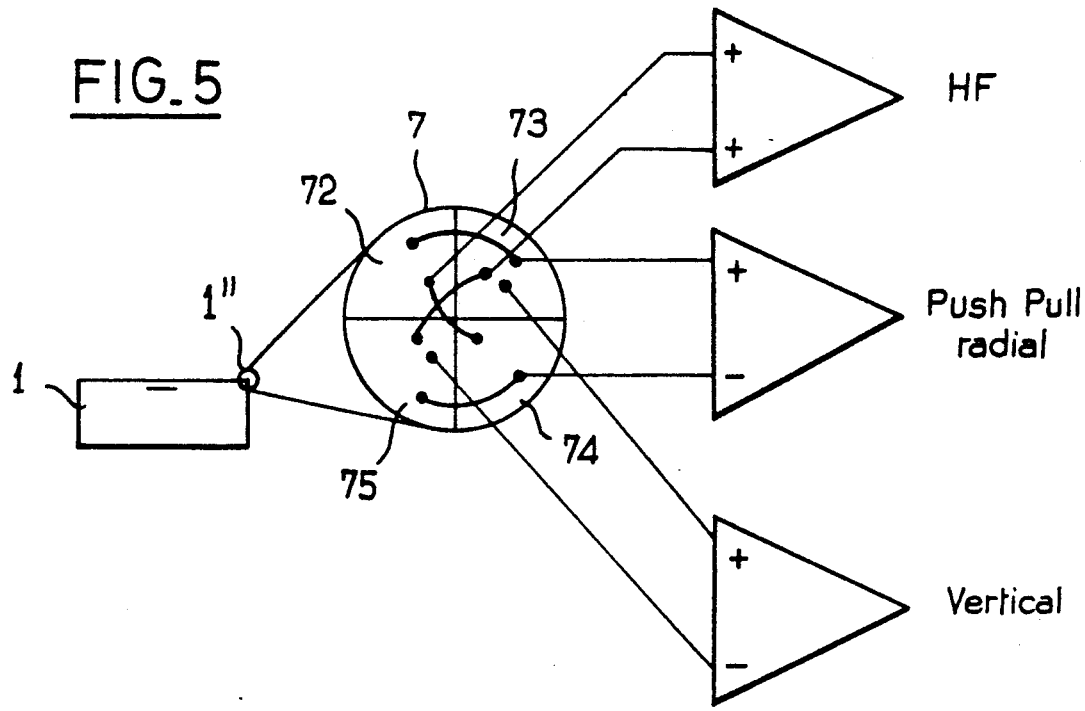
FIG_5

READER FOR OPTICAL RECORDING MEDIUM

The present invention concerns an optical reading device for an optical recording medium, more particularly an optical reading device that can be used especially in the reading heads of optical disks designated, in the market, by terms such as "compact disks", "video disks" or "digital optical disks".

In standard optical reading disks, the means generally used for splitting light energy consist of prisms or semi-transparent mirrors positioned so that the reflected beam emerging from the splitting device is directed along a line that is substantially perpendicular to the path of the extraction light beam. As a consequence the dimensions, notably the width of the reading device, are important. This is a hindrance to the reduction of the dimensions of the system as a whole.

To overcome these drawbacks, it has been proposed, notably in the French patent application No. 2 538 580, filed on behalf of the Pioneer Electronic Corporation, or in the French patent No. 2 597 249, filed on behalf of the present Applicant, that the splitting means used should consist of a diffraction grating or a birefringent grating. In this case, the beam reflected by the surface of the optical recording medium is reflected towards photosensitive detection means which are aligned with the light-emitting source substantially along one and the same axis perpendicular to the plane of the recording medium. Consequently, an optical reading device, far more compact than prior art devices, is obtained. However, to make it easy to set up the vertical servocontrol of the light beam on the recording medium, a diffraction grating is used giving an effect of astigmatism to the detection beam. In this case, the detection means are located in a plane close to the plane conjugate with the plane of the disk in the vicinity of the light emission source. The position of this plane should be defined very precisely. Indeed, this plane corresponds to the focal plane of the detection beam when the system is accurately focused. Since the position of the means is important, it follows therefrom that when the position settings are done, they should no longer be liable to modification which may be due, for example, to mechanical deformations of the reading device.

The present invention is therefore aimed at overcoming these drawbacks by proposing a novel optical reading device for an optical recording medium enabling the vertical servocontrol to be easily achieved.

Consequently, an object of the present invention is a device for the optical reading of an optical recording medium of the type comprising: a source for emitting a first light beam along a main optical axis; a splitter means to direct, along the main optical axis, the first beam towards the surface of the recording medium and to split a second beam obtained by reflection of the first beam on the surface of the recording medium so as to form a third beam directed along a secondary optical axis; a focusing means provided between the splitter means and the surface of the recording medium to focus the first beam on said surface; a mask to introduce a disymmetry in the third beam, and at least one detection device receiving at least one part of the third beam and giving at least one electrical signal expressing the detection made, characterized in that the mask is formed by at least one part of the external surface of the light-emitting source, the splitting means being positioned and made so that the mask is in the focusing plane of the third beam when the first beam is accurately focused.

According to a preferred embodiment, the light-emitting source is formed by a laser made in a semiconductor chip. Consequently, the mask is formed by one of the front edges of the chip, preferably a lateral edge. The mask may also be formed by one of the lower corners of the chip.

Furthermore, to prevent the third beam from being hidden by the upper or rear edge of the light-emitting source, the angle of deflection of the third beam is greater than the half-angle of aperture of the focusing means, seen from the light source.

Other characteristics and advantages of the present invention shall appear from the reading of the following description of various preferred and non-restrictive embodiments made with reference to the appended drawing wherein:

FIG. 1 is a schematic sectional view of a prior art optical reading device using a birefringent grating as a means for the splitting of the beam;

FIGS. 4 and 5 are schematic plane views showing the positioning of the detection cells with reference to the emission source and their connection to the error-detecting electrical circuits.

Figure 3:
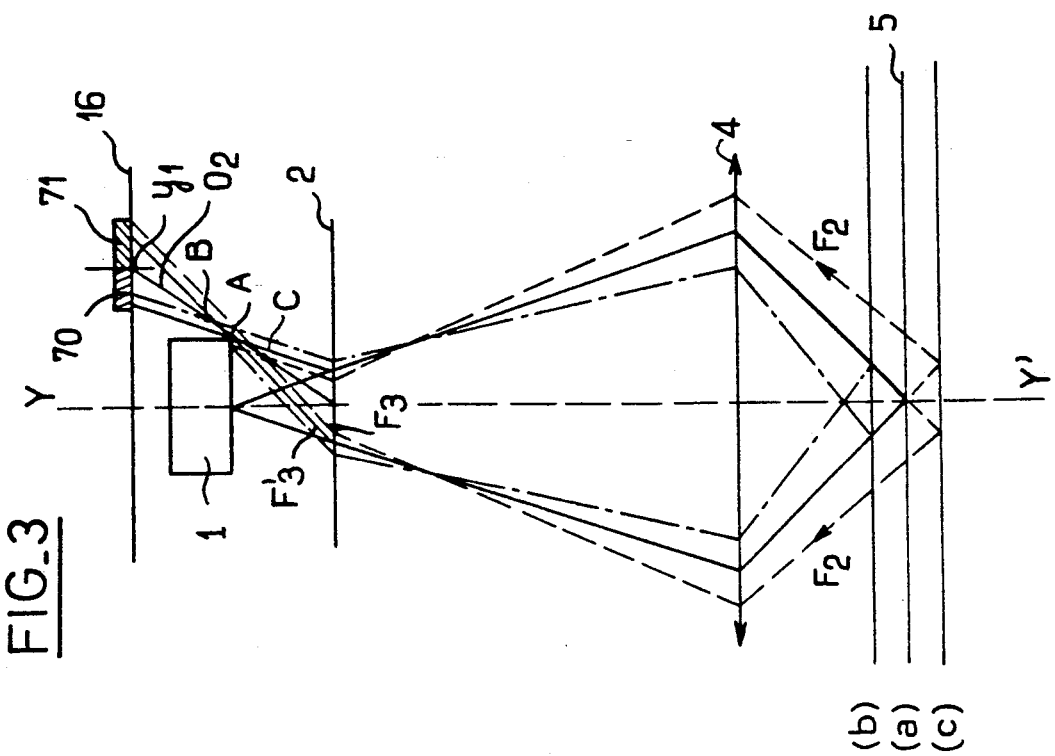
FIG. 3 is a view identical to that of FIG. 2, showing the working of the focusing system.

Referring to FIG. 1, we shall firstly describe an optical reading device according to the prior art, more particularly an embodiment of a reading device of the type described in the French patent application No. 2 598 249 filed on behalf of the present Applicant.

In this figure, the optical reading device as well as the recording medium or optical disk have been shown in a sectional view. The plane of the optical disk is formed by the axis XX' and the pieces of information recorded on the disk are scanned along this axis XX'. Furthermore, as shown in FIG. 1, the different elements of the optical reading device are aligned on an axis YY' perpendicular to the plane of the recording medium, namely perpendicular to the axis XX'.

As shown in FIG. 1, the reading device includes: a light source 1, such as a laser source placed on the axis YY' and emitting a first beam F1 of linearly polarized light along this axis; a beam splitter 2 working by polarization, formed by a phase grating 20 provided with grooves 21 located at the interface between two media 22, 23, of which one, namely 22, is not birefrigent while the other, 23, is birefrigent. This beam splitter 2 is placed perpendicularly to the beam F1 which it transmits without modification owing to the type and direction of the polarization of the light; a quarter wave plate 3 receiving the linearly polarized beam F1 and retransmitting this beam in the form of a circularly polarized beam F'1; a focusing lens 4 focusing the beam F'1 in the form of a beam F"1 so as to project a reading beam on the optical disk 5; the optical disk 5, the pieces of information of which (designated under the reference 50) go beneath the reading beam F"1, and detection devices 6 and 7 located in a plane P' that is non-conjugate with the plane of the disk 5, in the vicinity of the laser source 1 on either side of the axis YY', aligned on a direction parallel to the axis XX', i.e. perpendicularly to the direction YY'

The beam splitter 2 may also be formed either by a simple diffraction grating, as in the French patent application No. 2 538 580, filed on behalf of the firm Pioneer, or a polarizing splitter prism such as a Wollaston prism.

In the case of FIG. 1, we have shown a birefringent splitter grating which, in addition, is provided with grooves etched so as to obtain an effect of astigmatism on the detection beam.

The photodetectors 6 and 7 are integrated into one and the same unit or chip 16 which is preferably made of silicon. The role of the photodetectors 6 and 7 is to detect the radial and vertical positioning errors and to read the signal borne by the disk.

As shown in FIG. 1, the chip 16 containing the photodetectors 6 and 7 as well as the laser source 1 are assembled in one and the same package and prepositioned with respect to one another. The lens 4 may be mounted separately or it may be fixedly joined with the rest of the assembly to track the radial and vertical errors.

Furthermore, the laser source 1 and the elements of the chip 16 such as the photodetectors 6 and 7 are connected by electrical connections 11, 12, 13, 14 to external circuits (not shown).

The working of the optical reading device thus described is such that the reading beam F'1 is reflected by the disk in the form of a beam F2. When there is no information on the disk 5, the beam F2, after transmission by the lens 4, the quarter wave plate 3 and the splitter 2, gives rise to two diffracted beams F3, F 3 that are symmetrical with the axis YY' and have the same intensity if the set is properly focused. These beams reach the chip 16 at the location of the detectors 6 and 7 which detect a certain quantity of light. To enable the detection of errors in vertical servocontrol, the photodetector 7 is preferably formed by four photodetectors arranged crosswise in the plane P'. As a consequence, if the disk 5 is at a right distance from the lens 4, namely if the beam F"1 is properly focused, the diffracted beam F'3 reaches the four photodetectors in the form of a circle and illuminates each detector equivalently. However, if the distance from the disk 5 to the lens 4 differs with respect to the previous case, or if the lens 4 is shifted along the axis YY', the beam F'3 then projects an eliptical image on the photodetectors, and an error signal can be obtained from this elliptical image. For it to be possible to exploit this signal, the chip 16 should therefore be accurately positioned with respect to the laser source 1 and there should be no modifications in their respective distances.

Figure 2:
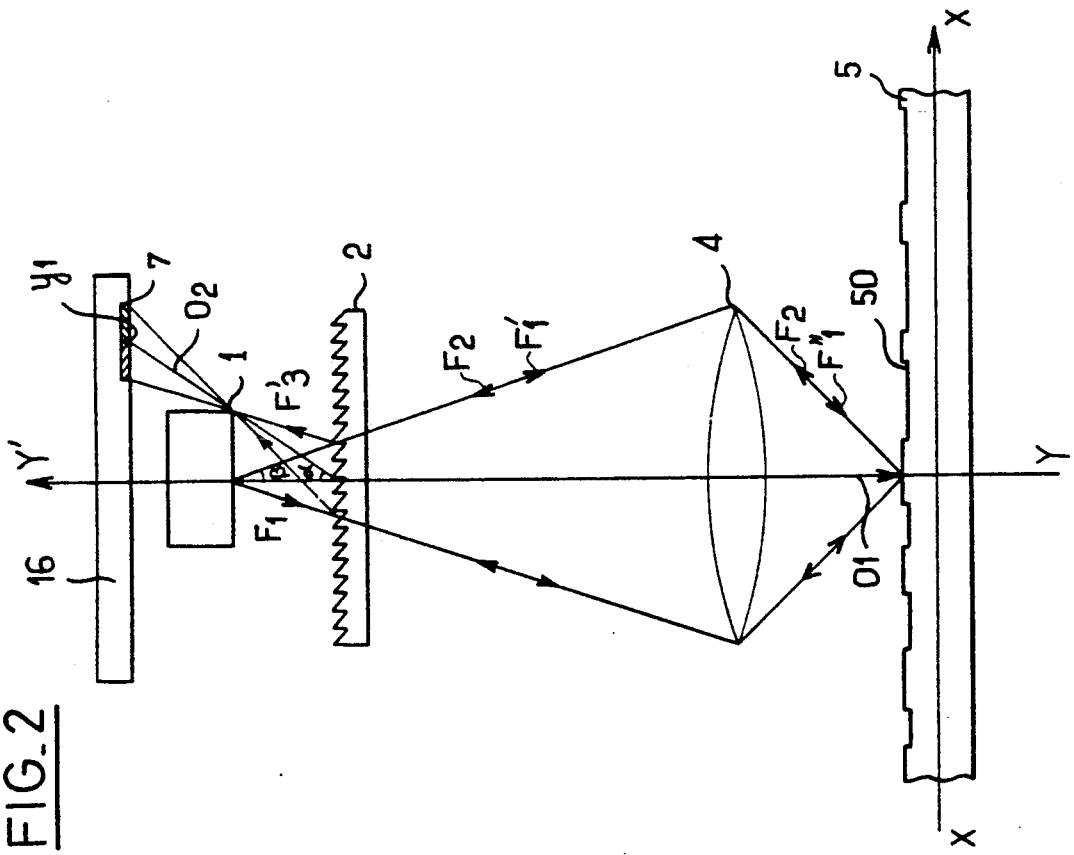
FIG. 2 is a schematic sectional view of an optical reading device according to an embodiment of the present invention.

To overcome this drawback, it is proposed, as shown in FIG. 2, to use a diffraction grating such as is mentioned above, but without any astigmatism effect, and to use a mask producing a disymmetry in the diffraction beam F'3. According to the present invention, the mask is formed by the light emission source 1 itself, namely the laser source. More particularly, the mask is formed by one of the lower edges of this light emission source which should be at the focusing point of the beam F'3 when the beam emitted by the source 1 is accurately focused on the disk 5 as shown in FIG. 2. For it to be possible to use the emission source 1 as a mask, the splitter means 2 should be positioned and made in a specific way. The splitter means 2 is positioned before the mounting of the focusing lens 4. The virtual image coming from the weak part of the beam F1 diffracted by the splitter means 2 is diffracted on the edge 1' of the laser source by translation and rotation of the splitter means.

In this case, the detection means 7 made in the chip 16 does not need to be positioned very precisely in relation to the laser source 1. Indeed, in this case, the light intensity picked up by this photodetector is examined at a distant field and not longer at the focusing point.

Furthermore, as shown in FIG. 2, to prevent the diffracted beam F'3 from being hidden by the upper edge of the source of emission, the deflection angle $\alpha$ of the beam F'3 is greater than the half-angle of aperture $\beta$ of the focusing means 4 seen from the light source 1.

We shall explain the working of the mask with reference to FIG. 3 which gives a very simplified view of the optical device of FIG. 2. As shown in FIGS. 2 and 3, the detection means 7 are, in this case, formed by at least two detector cells 70, 71 which are symmetrical with respect to a plane parallel to YY' and perpendicular to the chip 16 and go through the point Y1 determined by the second optical axis O2. Thus, when the plane of the disk 5 to be read is in an accurate vertical position, represented by the position a, the refracted beam F'3 represented by the solid line gets focused at A and, in this case, the two detectors 70 and 71 receive an equal quantity of rays. When there is defocusing, and when the plane of the disk is in position b, the reflected beam F2 and refracted beam F'3 follow the path represented by the lines of dashes. In this case, the beam F'3 gets focused at B and the mask formed by the source 1 intercepts a part of the beam F'3 going towards the detector 71. Conversely, when the plane of the track is in the position c, the reflected beam F2 and refracted beam F'3 follow the path represented by the lines of dots and dashes. The beam F'3 gets focused at C and the rays moving towards the detector 70 are intercepted by the mask In processing the signals coming from the two detectors 70 and 71, it is possible to obtain a focusing error signal that will enable the focusing to be corrected by servocontrol in a manner well known to those skilled in the art.

In general, the light source 1 is formed by a semiconductor laser. In this case, the chip may be cut along its crystalline axes. This gives edges that are quite rectilinear and gives a flawless mask. Furthermore, as shown in FIGS. 4 and 5, either the front edges, preferably the lateral edges 1' of the laser may be used as a mask but it is also possible to use one of the front corners 1" as a mask. In this case, instead of half of the reflection spot, it is simply a quarter of it that is hidden, thus making it possible to have greater sensitivity at the detectors.

Furthermore, as shown in FIGS. 4 and 5, the detector 7 is preferably formed by four photosensitive cells 72, 73, 74, 75 mounted crosswise. In this case, the center of the cross Y1 is at the meeting point of the secondary optical axis O2 with the plane of the chip 16. This enables the use of the signal coming from the detectors not only as a focusing servocontrol signal, namely a vertical servocontrol signal, but also as a radial servocontrol signal. If S2, S3, S4, S5 are the references given to the signals coming respectively from the cells 72, 73, 74 and 75, the radial servocontrol signal will be obtained by performing the function:

$$E^r = (S2 + S3) - (S4 + S5)$$

and the focusing or vertical servocontrol error signal will be obtained by performing the function $$E^v = (S3+S4)-(S2+S5)$$

It is also possible to obtain the reading signal HF from the detector 7 by performing the function:

$$S = S2+S3+S4+S5$$

These functions are performed in a manner known to those skilled in the art, notably by summing and subtracting the signals in operational amplifiers as shown in FIGS. 4 and 5.

As shown in FIG. 5, the vertical servocontrol can also be achieved by using simply the signals coming from the detector cells 73 and 75 and by obtaining the difference:

$$E^v = S3 - S5$$

FIG. 2 has been shown without any quarter wave plate. However, it is clear to those skilled in the art that a plate of this kind may be used, for example, between the splitter 2 and the focusing lens 4 to reduce, if necessary, the noise at the laser source in preventing light with the same polarization from being sent on to the laser.

The device described here above has high mechanical stability. In effect, the mask formed by the laser source and the return image get shifted at the same time in the event of mechanical deformation of the optical reading device.

I claim:

1. Device for the optical reading of an optical recording medium of the type comprising:
    a source (1) for emitting a first light beam (Fl) along a main optical axis (01),
    a splitter means (2) to direct, along the main optical axis, the first beam towards the surface of the recording medium (5) and to split a second beam (F2) obtained by reflection of the first beam o the surface of the recording medium so as to form a third beam (F'3) directed along a secondary optical axis;
    a focusing means (4) provided between the splitter means and the surface of the recording medium to focus the first beam on said surface;
    a mask (1', 1") to introduce a disymmetry into the third beam, and
    at least one detection device (7) receiving at least one part of the third beam (F'3) and giving at least one electrical signal expressing the detection made, characterized in that the mask (1', 1") is formed by at least one part of the external surface of the light-emitting source (1), and the splitter means (2) being positioned and made so that the mask is in the focusing plane of the third beam (F'3).

2. Optical reading device according to claim 1, characterized in that the light-emitting source (1) is formed by a laser made in a semiconductor chip, the mask (1') being formed by one of the front edges of the chip.

3. Optical reading device according to claim 2, characterized in that the mask is formed by one of the front lateral edges of the chip.

4. Optical reading device according to claim 1, characterized in that the light-emitting source (1) is formed by a laser made in a semiconductor chip, the mask (1") being formed by one of the lower corners of the chip.

5. Optical reading device according to claim 2, characterized in that the semiconductor chip is trued along its crystalline axes.

6. Optical reading device according to claim 3 characterized in that the semiconductor chip is true along its crystalline axes.

7. Optical reading device according to claim 4 characterized in that the semiconductor chip is true along its crystalline axes.

8. Optical reading device according to any of the claims 1, 5, 6 or 7, characterized in that the angle of deflection ($\alpha$) of the third beam is greater than the half-angle of aperture ($\beta$) of the focusing means, seen from the light source.

9. Optical reading device according to any of the claims 1, 5, 6, or 7, characterized in that the detection device is constituted by at least two photodetector cells (70, 71 positioned in a plane parallel to the plane of the recording medium, on either side of the plane of the support and passing through the meeting point of the secondary optical axis (O2) with the parallel plane.

10. Optical reading device according to any of the claims 1, 5, 6 or 7, characterized in that the detection device is constituted by four photodetector cells (72, 73, 74, 75), arranged in the form of a cross in the plane parallel to the plane of the medium, the center of the cross (Y1) being at the meeting point of the secondary optical axis (O2) with the parallel plane.

11. Optical reading device according to any of the claims 1, 5, 6 or 7, characterized in that the splitter means (2) is formed by a diffraction grating, a birefringent grating or a polarization splitter prism such as a Wollaston prism.

12. Optical reading device according to any of the claims 1, 5, 6 or 7, characterized in that it further includes a quarter wave plate located between the splitter means (4) and the recording medium (5).

* * * * *